Figure 1:
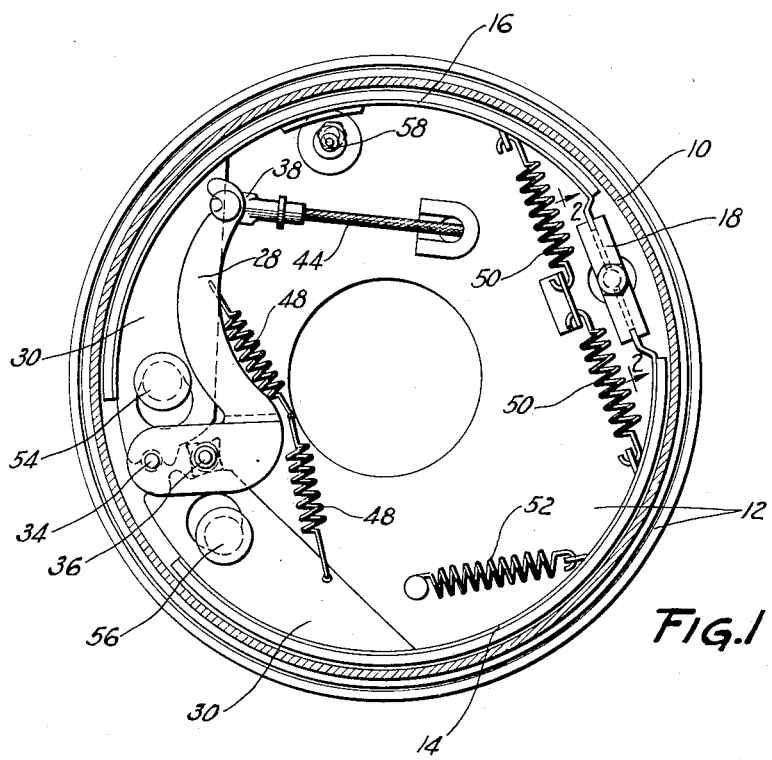

Nov. 14, 1933.   W. S. WATTS   1,935,340
BRAKE
Original Filed Jan. 9, 1930

INVENTOR.
WILLIAM S. WATTS
BY *F. D. Keiper*
ATTORNEY

UNITED STATES PATENT OFFICE 1,935,340

BRAKE

William S. Watts, South Bend, Ind., assignor, by mesne assignments, to Bendix Brake Company, South Bend, Ind., a corporation of Illinois Original application January 9, 1930, Serial No. 419,521. Divided and this application March 28, 1932. Serial No. 601,634

3 Claims. (Cl. 188—79.5)

This invention relates to band type brakes and more particularly to adjusting mechanism for the bands therein.

In the operation of band brakes, especially those containing lined friction surfaces, considerable wear takes place, and as a result thereof, the band soon fails to engage the brake drum properly. To bring about recurrence of proper conditions, it is necessary to lengthen or shorten the friction band, depending upon whether the brake is internal expanding or external contracting. Mechanism for performing this function in order to be satisfactory should be readily accessible, strong, durable and easily adjustable.

It is accordingly an object of my invention to provide a novel adjusting mechanism for band brakes, which operates to vary the band length.

A further object of my invention is the provision of opposed wedges so arranged and fitted to the brake band of an internal expanding brake as to afford a simplified construction, readily accessible and durable adjusting means therefor.

The above and other novel features of my invention will appear more fully hereinafter from the following detailed description when taken in connection with the accompanying drawing. It is expressly understood, however, that the drawing is employed for purposes of illustration only and is not designed as a definition of the limits of my invention, reference being had for this purpose to the appended claims.

Figure 2:
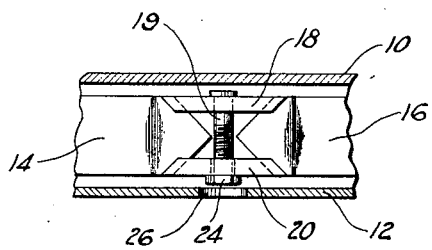

In the drawing wherein like reference characters refer to like parts, throughout the several views, Figure 1 is a side elevation of my novel brake and adjusting means therefor; and Figure 2 is a section looking in the direction of the arrows 2—2 of Figure 1 disclosing my novel wedge expansion structure.

A preferred form of my invention is illustrated as mounted upon an internal expanding type band brake comprising a drum 10, a backing plate 12, and a pair of internal band sections 14 and 16. Reinforcing plates 30 are fixed to each band in any suitable manner and are adapted to engage the anchors 54 and 56 in a manner well understood in the art. Tension springs 48, 50 and 52 together with an eccentric adjustable stop member 58 are provided to maintain the brake band in proper relation to the brake drum.

To apply the brake, a bell crank lever 28 preferably formed of two stampings arranged on either side of the reinforcing plates 30 is provided having pivots 34 and 36 carrying a roller and block respectively between the said plates which rollers engage the suitably shaped ends of the reinforcing plates 30. Associated with the free end of the lever, there is provided a cable 44 attached to the lever by means of a suitable fitting 38 further details of which are immaterial for an understanding of my novel adjustment mechanism and which are fully described in a copending application, identified below.

For the purpose of providing an improved adjusting means, the adjacent ends of the brake bands, diametrically opposite the operating lever are pointed or cut to a shallow V shape. Wedge blocks 18 and 20, which are suitably grooved to slide upon the V ends of the brake band, as shown in Figure 2, are fitted thereon and held together by a bolt 19 pressed into an opening in block 18 and passing loosely through an opening in the wedge block 20 and having threaded thereon a nut 24. A hole 26 is conveniently placed in the backing plate 12 in order to provide ready access to the nut 24. As may be seen in the drawing, the wedge blocks are of sufficient thickness to provide ample groove length whereby the adjustable joint in the band is rendered sufficiently stiff without outside support.

In order to take up wear or increase the effective length of the brake bands, it is merely necessary to tighten the adjusting nut 24 on the bolt 19, thus drawing the wedge plates 18 and 20 closer together, and spreading the V band ends apart, any desired amount.

I have thus provided a novel adjusting mechanism which is simple in construction, effective, and which may be placed in a readily accessible position.

Though only one embodiment of my invention has been illustrated and described, in connection with an internal expanding brake, it is to be understood that the invention is not limited thereto but may be embodied in various mechanical forms of brakes. For example the adjusting mechanism may be reversed so as to be readily applicable to external brakes. As such changes in construction and arrangement of parts may be made without departing from the spirit of the invention, as will be apparent to those skilled in the art, reference will be had to the appended claims for a definition of the limits of my invention.

This application is a division of my copending application entitled "Brakes", Serial No. 419,521, filed January 9, 1930.

I claim:

1. A brake comprising, in combination, band sections forming the friction element of the brake, said sections being V-shaped at their proximate ends, together with a floating adjustment for separating said ends, said adjustment comprising oppositely disposed wedge-shaped members slotted at their ends to receive the V-shaped portions of said band, and a bolt passing through said blocks with its head engaging one of them and having adjustably threaded on its end a nut engaging the other block.

2. A brake comprising, in combination, band sections forming the friction element of the brake, said sections being V-shaped at their proximate ends, together with a floating adjustment for separating said ends, said adjustment comprising oppositely disposed wedge-shaped members slotted at their ends to receive the V-shaped portions of said band, said wedge-shaped members movable toward each other, to effect the aforementioned separation, by a bolt rigidly secured to one of said members and sleeved through the other of said members and having a nut adjustably threaded on its end and engaging said other member.

3. A brake comprising, in combination, a drum, band sections forming the friction element of the brake and arranged to anchor on one section when the drum is turning in one direction and to anchor on the other section when the drum is turning in the other direction, said sections being V-shaped at their proximate ends, said ends disposed in a plane substantially perpendicular to the plane of the brake, together with wedge means movable relative to said sections to effect separation thereof and an operating bolt having its head engaging one part of the wedge means and having adjustably threaded thereon a nut engaging another part of the wedge means.

WILLIAM S. WATTS.